Sept. 9, 1952 M. E. STANLEY 2,610,111
ORNAMENTAL CAKE PLATTER
Filed April 9, 1951 2 SHEETS—SHEET 1

Mary E. Stanley
INVENTOR.

BY *Clarence A. O'Brien*
*and Harvey B. Jacobson*
Attorneys

Sept. 9, 1952 M. E. STANLEY 2,610,111
ORNAMENTAL CAKE PLATTER
Filed April 9, 1951 2 SHEETS—SHEET 2
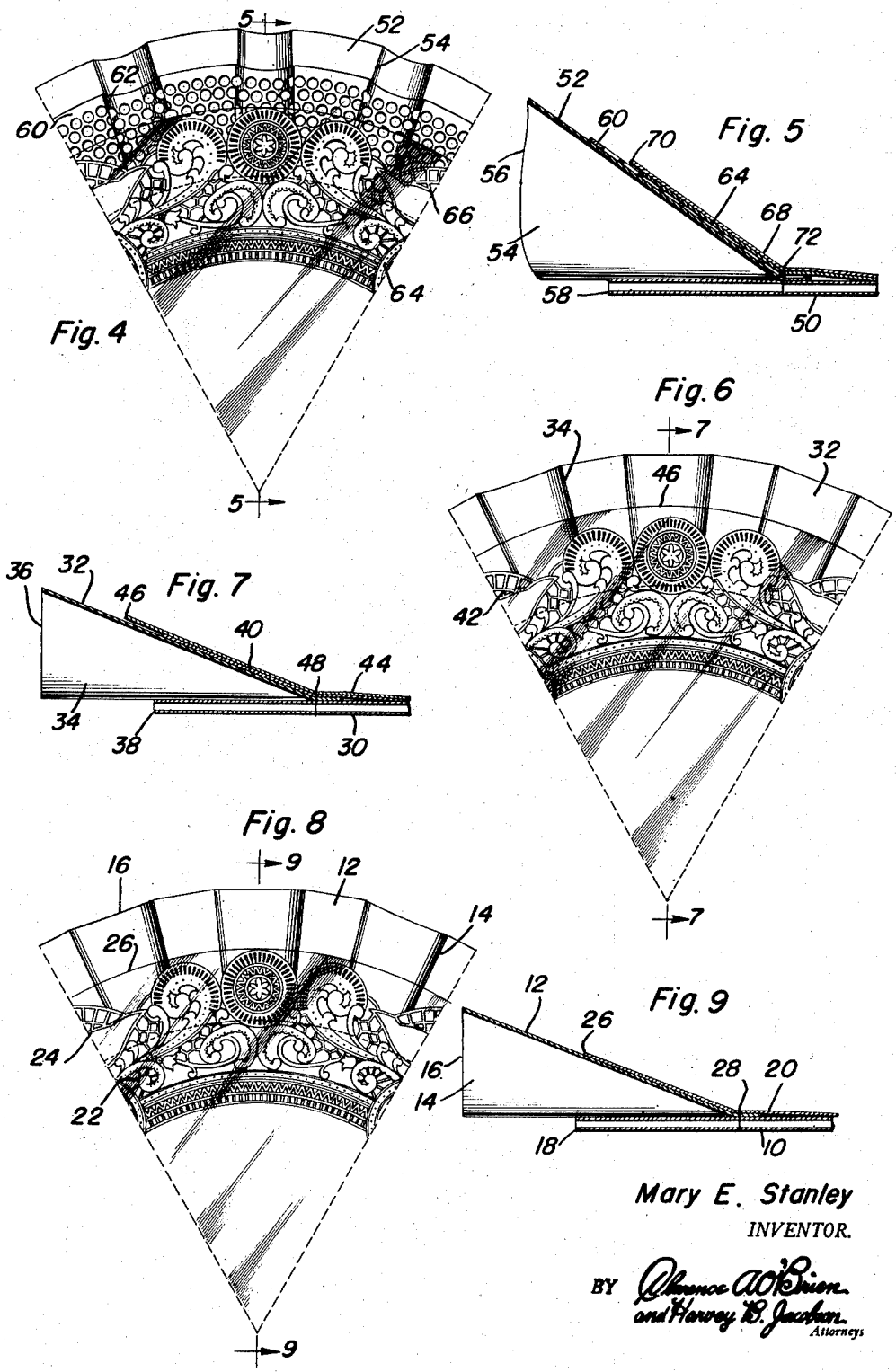
Mary E. Stanley
INVENTOR.

Patented Sept. 9, 1952

2,610,111

UNITED STATES PATENT OFFICE 2,610,111

ORNAMENTAL CAKE PLATTER

Mary E. Stanley, Rockingham, N. C.

Application April 9, 1951, Serial No. 220,112

1 Claim. (Cl. 41—10)

This invention relates to an attractive, inexpensive and useful ornamental cake platter and constitutes a continuation-in-part of applicant's co-pending application Serial No. 162,637, filed May 18, 1950, on which Patent No. 2,552,297 was granted on May 8, 1951.

The primary difference between the cake platter of the present invention and that disclosed in the parent application resides in the fact that no plurality of concentric overlapping ruffles are employed. Instead, the present invention comprises a relatively rigid base plate upon which is appropriately secured adjacent the marginal edge thereof a plurality of overlapping sheets of decorative material so configurated and secured to the base plate as to provide a cake platter which is extremely attractive in appearance, is dished out centrally to properly locate and retain a cake thereon and which so protects some of the decorative materials from crumbs falling from the cake so as to allow the cake platter to be re-used a number of times.

Other objects and features of the invention will become readily apparent from the following description when considered with the accompanying drawings, wherein:

Figure 4 is a top plan sectoral view of another form of the invention;

Figure 5 is a sectional view taken substantially on the plane of section line 5—5 of Figure 4;

Figure 6 is a top plan sectoral view of a third form of the invention;

Figure 7 is a sectional view taken substantially on the plane of section line 7—7 of Figure 6;

Figure 8 is a top plan sectoral view of a fourth form of the invention; and

Figure 9 is a sectional view taken substantially on the plane of section line 9—9 of Figure 8.

Specific reference will now be made to the drawings. In the several views in the accompanying drawings and in the following specification reference characters indicate corresponding elements throughout.

Figure 1:
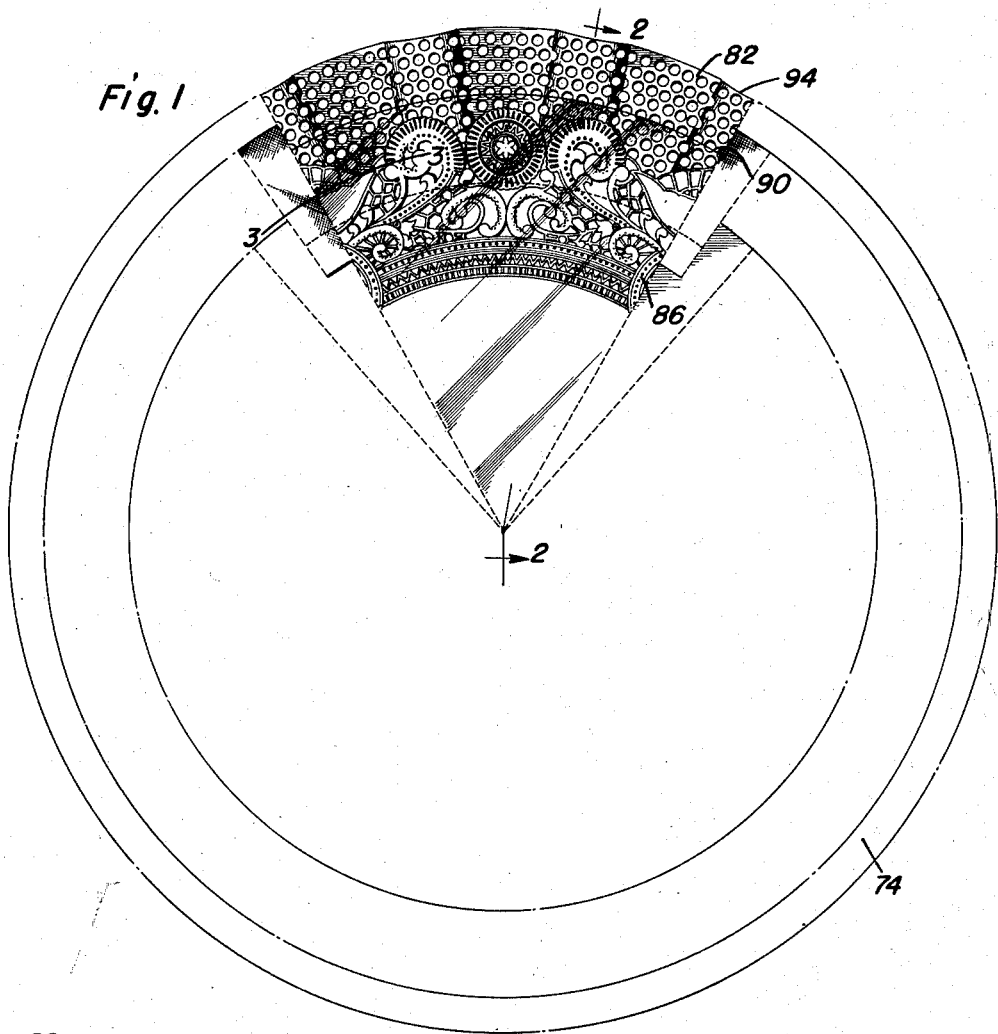
Figure 1 is a top plan view of one of the cake platters, a repeat sector of which is contained between the dotted lines, it being understood that the repeat sector extends throughout the plate.

Referring first to the simplest form of the invention as illustrated in Figures 8 and 9, the present cake platter comprises a relatively rigid base plate 10, which is preferably fabricated of cardboard and circular, and positioned on the cake platter is a ruffle 12 having upstanding box plaits 14, the outer end 16 of which extends beyond the peripheral edge 18 of the base plate 10. A transparent pliable plastic sheet 20 is provided upon which is embossed doily configurations 22 which include perforate configurations 24 around the margin 26 of the transparent sheet. The pliable transparent plastic sheet 20 may be fabricated of a number of plastics, such as "cellophane," and the doily configurations 22 and 24 may be embossed thereon in a conventional manner with a suitable die in a press. The ruffle 12 may be fabricated of suitably colored textile materials and the latter may be secured at its inner end to the base plate 10 together with the transparent plastic sheet 20 by a common means such as stitching 28 or staples if desired. As shown clearly in Figure 9, this cake platter has a marginal raised portion and a central depressed or dished-in portion for properly locating and retaining the cake on the platter. Since the perforate configurations 24 overlie the inner portions of the ruffle 12, the latter will be somewhat protected from crumbs falling off the cake and the same time the entire cake platter will be very attractive in appearance.

In the modification shown in Figures 6 and 7, a relatively rigid base plate 30 is provided equivalent to the base plate 10 and disposed thereon is a ruffle of textile material 32 having upstanding box plaits 34, the outer edge 36 of which extends beyond the marginal edge 38 of the base plate. A paper doily 40 having perforate configurations 42 at the outer edge or margin thereof is disposed on the base plate with the marginal configurations overlapping a portion of the ruffle 32 as shown clearly in the drawings. A pliable transparent plastic sheet 44 is disposed upon the base plate in such a manner that it covers the doily and has an outer marginal edge 46 which extends beyond the marginal edge of the doily 40. The inner edges of the ruffle 32 and doily 40 are secured by a common means together with the transparent plastic sheet 44 to the base plate as by stitching 48, staples or any other suitable means. In this form of the invention the doily is fabricated of paper and is a sheet separate from the transparent plastic sheet and, as in the modification previously described, the cake platter is dished out to properly locate and retain a cake thereon and is attractive by virtue of the doily configurations and the ruffle 32 showing through the perforate marginal configurations 42 of the doily. Since the outer marginal edge of the transparent sheet extends beyond the outer marginal edge of the paper doily, a substantial portion of the ruffle 32 will be protected from falling crumbs to a greater extent than the protection afforded in the previously described modification.

In the modification shown in Figures 4 and 5, a relatively rigid base plate 50 is provided upon which is secured at its inner edge a ruffle 52 of textile material which is provided with upstanding plaits 54. While these plaits resemble box plaits they are not necessarily box plaits and extend radially of the ruffle. The outer edge 56 of the ruffle extends beyond the outer marginal edge 58 of the base plate and secured at its inner edge on the base plate and overlying a portion of the ruffle 52 is a further ruffle 60 of colored netting having plaits 62 which engage the plaits 52 of the first-named ruffle 52. The ruffle 60 of colored netting is, in effect, a tinsel sheet fabricated preferably of a perforated thin metal, such as tin, aluminum and the like, the tinsel sheet being sufficiently flexible to conform to the contour of the ruffle 52 and yet rigid enough to hold the ruffle 52 in an elevated position relative to the plane of the base plate 50. This is accomplished by the fact that the ruffles 62 of the tinsel sheet 60 actually engage and exert a gripping action on the inner portions of the plaits 54 of the ruffle 52.

Secured upon the base plate is a paper doily 64 which has perforate doily configurations 66 around the outer marginal edge thereof, these perforate doily configurations overlapping a portion of the colored netting or tinsel sheet 60. Secured upon the base plate 50 is a pliable transparent plastic sheet 68, the outer edge 70 of which extends beyond the outer marginal edge of the paper doily 64. The ruffle 52, the tinsel sheet 60, the paper doily 64 and the transparent plastic sheet 68 may all be secured upon the base plate 50 by a common means such as stitching 72, staples or any other suitable attaching means. In this form of the invention, the tinsel sheet 60 is effective in retaining the ruffle 52 and the outer marginal portions of the doily 64 and plastic sheet 68 in a normally elevated position so that the platter has a central dished-in or depressed portion for properly locating and retaining the cake on the platter. The transparent plastic sheet protects the doily and the ruffle 52 from falling crumbs and the perforated tinsel sheet 60 also serves to protect the ruffle 52 and itself cannot be readily soiled.

Figure 2:
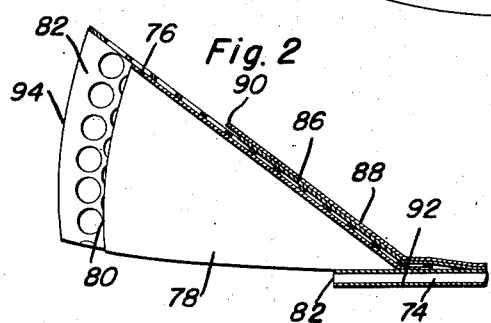
Figure 2 is a sectional view taken substantially on the plane of section line 2—2 of Figure 1.
Figure 3:
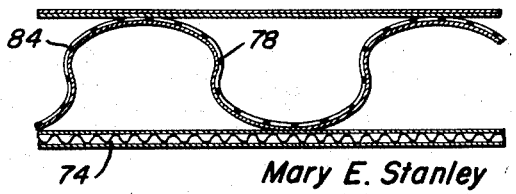
Figure 3 is a sectional view taken substantially on section line 3—3 of Figure 1.

The modification shown in Figures 1 to 3 is substantially the same as that shown in Figures 4 and 5 except for one major difference which will appear hereinafter. It comprises a substantially circular, relatively rigid base plate 74 upon which is secured at its inner edge a ruffle 76 having upstanding curved plaits 78, the outer edge 80 of the ruffle extending beyond the outer marginal edge 81 of the base plate. A ruffle of colored netting or tinsel sheet 82 is provided which is secured at its inner edge on the base plate and which has upstanding curved plaits 84 which conform to the contour of the plaits 78 and engage and slightly grip them. Secured upon the base plate is a paper doily 86 which overlaps a portion of the tinsel sheet 82 and secured upon the base plate is a transparent pliable plastic sheet 88, the outer marginal edge 90 of which extends beyond the outer marginal edge of the doily. As in the previous modifications, the ruffle, tinsel sheet, doily and transparent plastic sheet may all be secured on the base plate by a common means such as stitching 92, or staples or any other suitable attaching means. This modification differs from the one shown in Figures 4 and 5 in that the outer edge 94 of the tinsel sheet extends beyond the outer edge 80 of the textile ruffle 76. This imparts greater rigidity to the structure and securely maintains the outer peripheral portion of the cake platter in a raised position relative to the plane of the base plate to allow for proper location and retention of the cake on the platter. This construction also affords greater protection of the textile ruffle against falling crumbs.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

An ornamental cake platter comprising a relatively rigid and substantially circular base plate, a single annular ruffle including a flat inner edge portion secured to said base plate at points spaced inwardly from the marginal edge of the latter and a main body portion comprising a plurality of radial plaits projecting beyond the marginal edge of the base plate, a substantially circular paper doily secured on said base plate and having an ornamental perforate marginal portion overlapping the main body portion of said ruffle, the marginal edge of said doily being spaced inwardly from the marginal edge of the ruffle, and a substantially circular sheet of pliable transparent plastic secured to said base plate and covering said doily, the marginal edge of said transparent plastic being spaced outwardly from the marginal edge of the doily and spaced inwardly from the marginal edge of said ruffle, said doily and said base plate being substantially equal in diameter.

MARY E. STANLEY.

REFERENCES CITED

The following references are of record in the file of this patent:

UNITED STATES PATENTS

| Number | Name | Date |
|---|---|---|
| 1,631,205 | Horner | June 7, 1927 |
| 2,482,981 | Kamrass | Sept. 27, 1949 |
| 2,552,297 | Stanley | May 8, 1951 |